(12) United States Patent
George

(10) Patent No.: US 6,314,609 B1
(45) Date of Patent: Nov. 13, 2001

(54) MOUTH POWERED VACUUM

(76) Inventor: Connie George, 210 Sherman St., Healdsburg, CA (US) 95448

( * ) Notice: Subject to any disclaimer, the term of this patent is extended or adjusted under 35 U.S.C. 154(b) by 0 days.

(21) Appl. No.: 09/498,633

(22) Filed: Feb. 7, 2000

(51) Int. Cl.$^7$ ........................................ A47L 5/02
(52) U.S. Cl. ........................ 15/341; 15/344; 15/353
(58) Field of Search ............................. 15/341, 353, 339, 15/344; 55/467, 505; 128/200.14, 200.21, 200.18, 203.12, 204.11, 204, 12; 239/318

(56) References Cited

U.S. PATENT DOCUMENTS

| | | | |
|---|---|---|---|
| 750,521 | * | 1/1904 | Braymer ........................ 128/200.14 |
| 1,759,729 | | 5/1930 | Berger .................................. 209/510 |
| 1,843,499 | | 2/1932 | Walcott ................................ 209/510 |
| 2,461,815 | * | 2/1949 | Gill ........................................ 15/313 |
| 2,476,425 | | 7/1949 | McLeary ............................. 209/510 |
| 2,819,716 | * | 1/1958 | Miller ............................... 128/200.21 |
| 3,353,536 | * | 11/1967 | Bird et al. ........................ 128/200.18 |
| 3,826,255 | * | 7/1974 | Havstad et al. ................. 128/200.18 |
| 3,965,608 | * | 6/1976 | Schuman ................................ 15/341 |
| 4,179,769 | * | 12/1979 | Lundquist ............................... 15/353 |
| 5,377,383 | * | 1/1995 | Christensen ............................ 15/353 |
| 6,223,745 | * | 5/2001 | Hammarlund et al. ......... 128/200.18 |

* cited by examiner

*Primary Examiner*—Terrence R. Till
*Assistant Examiner*—Theresa T. Snider
(74) *Attorney, Agent, or Firm*—Jack Lo

(57) ABSTRACT

A mouth powered vacuum is provide with a cap with a lip at a lower end attached around a mouth of a bottle. The lip is made of a resilient material, so that it can be snapped on and off the bottle without twisting. A curved intake channel is connected between a side and a bottom of the cap. A flexible pickup tube is inserted into the intake channel at the side of the cap for being swept over objects to be picked up. A generally rigid mouth piece is integrally attached to the cap, and positioned sideward and upward for being sucked by a user. The angle between the mouthpiece and the bottle is selected to enable the bottle to be held comfortably when the mouthpiece is placed between the user's lips. A mouthpiece channel is connected between a distal end of the mouthpiece and the bottom of the cap. The inner end of the mouthpiece channel is enlarged relative to the outer end. A screen is positioned across the enlarged inner end of the mouthpiece channel for preventing the user from inhaling the objects. The screen is much larger than the outer end of the mouthpiece channel for improving airflow.

7 Claims, 1 Drawing Sheet

MOUTH POWERED VACUUM

BACKGROUND OF THE INVENTION

1. Field of the Invention

This invention relates generally to suction devices for collecting small objects.

2. Prior Art

Beads are often used in crafts. People who frequently handle beads know that picking them up or sorting them by hand one at a time is extremely tedious. Although some siphon devices are known in the prior art for sorting fish eggs, they are not suited for picking up beads.

One such fish egg siphon device is disclosed in U.S. Pat. No. 2,476,425 to McLeary. It is comprised of a bottle with a stopper in its mouth. A pickup tube and a discharge tube are inserted through the stopper. The rigid discharge tube is directed downwardly. A valve and a squeeze bulb are connected to the distal end of the discharge tube. The bulb is pumped to start the siphon action for drawing water and fish eggs into the bottle. A screen at the inner end of the discharge tube prevents the eggs from leaving the bottle. The discharge tube is long enough to extend below the lowest possible position of the pickup tube, otherwise the siphon action cannot occur.

Another fish egg siphon device is disclosed in U.S. Pat. No. 1,843,499 to Walcott. It is comprised of a squeeze bulb attached directly to the mouth of a bottle. A rigid pickup tube is attached to one end of the bulb, and a discharge tube is attached to an opposite end of the bulb. Siphon action is started by squeezing the bulb. Again, the discharge tube must be long enough to extend below the pickup tube. The inner end of the discharge tube is pierced to serve as a screen for preventing the eggs from leaving the bottle.

Yet another fish egg siphon device is disclosed in U.S. Pat. No. 1,759,729 to Berger. It is comprised of a cap attached to the mouth of a bottle. A rigid pickup tube is attached to an intake channel in the cap. A squeeze bulb is integrally attached to the cap, and connected to a discharge channel in the cap. A discharge tube is attached to the distal end of the bulb, and is extended to a position below the pickup tube. The bulb is squeezed to start the siphon action. A tiny screen is positioned at the inner end of the discharge channel for blocking fish eggs.

Prior art siphon devices work well for picking up fish eggs in water, but they cannot pick up beads on a table or floor because siphon action cannot occur without water. Further, the screens are each comprised of holes pierced through the inner end of the discharge tube, which is relatively expensive to manufacture. The screens also have small surface areas that can easily become clogged.

OBJECTIVES OF THE INVENTION

Accordingly, the objectives of the present mouth powered vacuum are:

to pick up small objects on a dry surface;

to pick up the objects very quickly to reduce the tediousness of the task;

to pick up the object with very little physical exertion;

to be ergonomically arranged for easy operation;

to prevent the objects from being inhaled by the user;

to ensure unrestricted airflow;

to allow the objects to be viewed after they are collected;

to be easily opened for being emptied; and to be very simple and inexpensive to produce.

Further objectives of the present invention will become apparent from a consideration of the drawings and ensuing description.

BRIEF SUMMARY OF THE INVENTION

The present mouth powered vacuum is comprised of a cap with a lip at a lower end attached around a mouth of a bottle. The lip is made of a resilient material, so that it can be snapped on and off the bottle without twisting. A curved intake channel is connected between a side and a bottom of the cap. A flexible pickup tube is inserted into the intake channel at the side of the cap for being swept over objects to be picked up. A generally rigid mouth piece is integrally attached to the cap, and positioned sideward and upward for being sucked by a user. The angle between the mouthpiece and the bottle is selected to enable the bottle to be held comfortably when the mouthpiece is placed between the user's lips. A mouthpiece channel is connected between a distal end of the mouthpiece and the bottom of the cap. The inner end of the mouthpiece channel is enlarged relative to the outer end. A screen is positioned across the enlarged inner end of the mouthpiece channel for preventing the user from inhaling the objects. The screen is much larger than the outer end of the mouthpiece channel for improving airflow.

DRAWING REFERENCE NUMERALS

10. Cap
11. Lip
12. Mouth
13. Bottle
14. Intake Channel
15. Side
16. Bottom
17. Pickup Tube
18. Mouthpiece
19. Mouthpiece Channel
20. Screen
21. Annular Notch

DETAILED DESCRIPTION OF THE INVENTION

Figure 1:
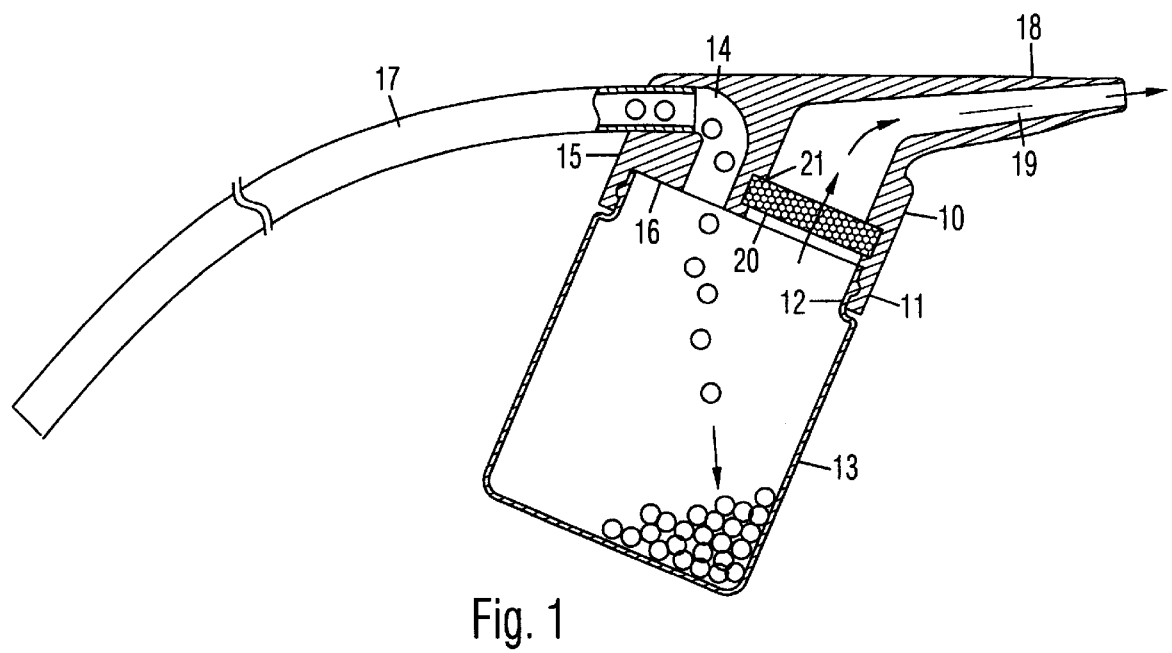
FIG. 1 is a side cutaway view of the present mouth powered vacuum.

A preferred embodiment of the present mouth powered vacuum is shown in a side cutaway view in FIG. 1. It is comprised of a cap 10 with a lip 11 at a lower end attached around a mouth 12 of a bottle 13, which is preferably transparent for viewing objects collected inside. Cap 10 is preferably made of a resilient material, such as rubber or silicon, so that it can be snapped on and off bottle 13 for emptying without twisting. A curved intake channel 14 is connected between a side 15 and a bottom 16 of cap 10. A flexible pickup tube 17 is inserted into an outer end of intake channel 14 for being swept over objects to be picked up, such as beads on a table or floor. The outer end of intake channel 14 is preferably curved downward, so that pickup tube 17 is angled downward for being more easily pointed downward in use.

Figure 2:
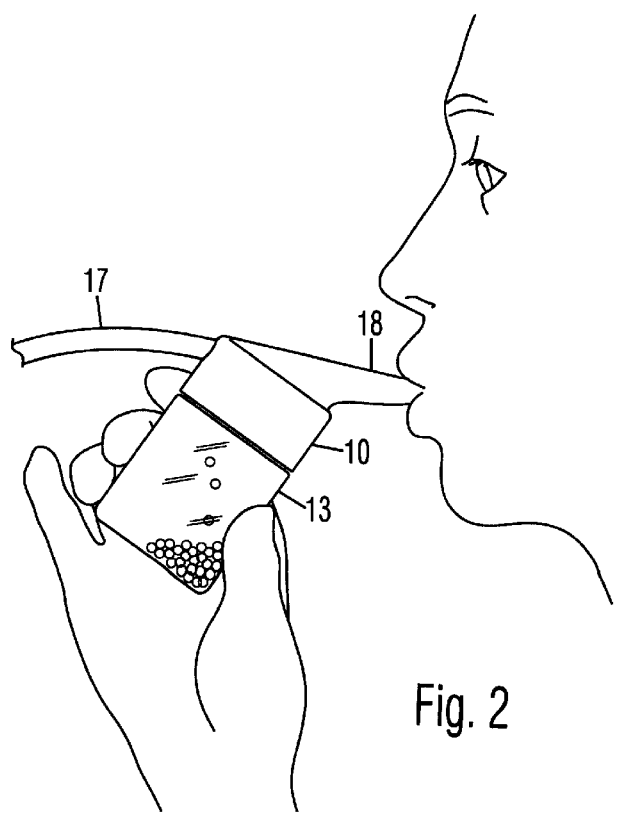
FIG. 2 is a side view thereof in use.

A generally rigid mouthpiece 18 is integrally attached to cap 10, and positioned sideward and upward for being sucked by a user. Mouthpiece 18 terminates at a position higher than bottle 13 for positioning bottle 13 closer to the mouth of the user. The angle between a distal end of mouthpiece 18 and bottle 10 is preferably between about 100–135 degrees. The angle enables bottle 13 to be held comfortably by a hand when the mouthpiece is placed between the user's lips, as shown in FIG. 2. A mouthpiece channel 19 is connected between the distal end of mouthpiece 18 and bottom 16 of cap 10. The inner end of mouthpiece channel 19 is substantially enlarged relative to the outer end thereof. A screen 20 is positioned across the enlarged inner end of mouthpiece channel 19 in a circumferential notch 21 for preventing the user from inhaling the objects. Screen 20 is much wider than the outer end of mouthpiece channel 19 for improving airflow. Except for pickup tube 17 and screen 20, cap 10 and mouthpiece 18 are preferably made as a single unit for economy.

In use, the present vacuum picks up small objects, such as beads, very quickly. The capacity of the human lung is much larger than that of the squeeze bulbs used in prior art siphons, so that a single breath can collect many beads with little physical exertion. While bottle 13 is held relatively stationary in one hand, flexible pickup tube 17 is easily moved with the other hand over the objects to pick them up. The present vacuum thus makes collecting small objects, particularly beads, much less tedious than by hand.

SUMMARY AND SCOPE

Accordingly, the present mouth powered vacuum picks up small objects on a dry surface. It picks up the objects very quickly to reduce the tediousness of the task. It picks up the object with very little physical exertion. It is ergonomically arranged for easy operation. It prevents the objects from being inhaled by the user. It ensures unrestricted airflow. It allows the objects to be viewed after they are collected. It is easily opened for being emptied. It is also very simple and inexpensive to produce.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

I claim:

1. A mouth powered vacuum, comprising:

a bottle with a mouth at an upper end;

a cap detachably attached around said mouth of said bottle;

a flexible pickup tube attached to said cap and in communication with said bottle, an outer end of said pickup tube for being swept over objects to be picked up;

a generally rigid mouthpiece attached to said cap for being sucked by a user, a distal end of said mouthpiece extending generally sideward from said cap and terminating at a position higher than said bottle, thus enabling said bottle to be held comfortably by a hand when said mouthpiece is being sucked by said user; and a mouthpiece channel connected between said distal end of said mouthpiece and a bottom of said cap, an inner end of said mouthpiece channel being substantially enlarged relative to an outer end thereof; and a screen positioned across said mouthpiece channel adjacent said inner end thereof for preventing said user from inhaling said objects, said screen being substantially wider than said outer end of said mouthpiece channel for improving airflow;

whereby said mouth powered vacuum is arranged for picking up small objects very quickly by being able to pick up many of said small objects with each breath.

2. The mouth powered vacuum of claim 1, wherein said cap and said mouthpiece are made as a single unit for economy.

3. The mouth powered vacuum of claim 1, wherein said bottle is transparent for viewing said objects collected inside.

4. The mouth powered vacuum of claim 1, wherein said distal end of said mouthpiece is also angled upward to enable said bottle to be comfortably held by said hand while said mouthpiece is sucked by said user.

5. A mouth powered vacuum, comprising:

a bottle with a mouth at an upper end;

a cap detachably attached around said mouth of said bottle;

a flexible pickup tube attached to said cap and in communication with said bottle, an outer end of said pickup tube for being swept over objects to be picked up;

a generally rigid mouthpiece attached to said cap for being sucked by a user, a distal end of said mouthpiece extending generally sideward and upward from said cap and terminating at a position higher than said bottle, thus enabling said bottle to be held comfortably by a hand when said mouthpiece is being sucked by said user; and a mouthpiece channel connected between said distal end of said mouthpiece and a bottom of said cap, an inner end of said mouthpiece channel being substantially enlarged relative to an outer end thereof;

an circumferential notch arranged in said mouthpiece channel adjacent said inner end thereof; and a screen secured in said circumferential notch in said mouthpiece channel for preventing said user from inhaling said objects, said screen being substantially wider than said outer end of said mouthpiece channel for improving airflow;

whereby said mouth powered vacuum is arranged for picking up small objects very quickly by being able to pick up many of said small objects with each breath.

6. The mouth powered vacuum of claim 5, wherein said cap and said mouthpiece are made as a single unit for economy.

7. The mouth powered vacuum of claim 5, wherein said bottle is transparent for viewing said objects collected inside.

* * * * *